Nov. 12, 1968  W. BEZBATCHENKO, JR  3,410,329
ASYMMETRICAL DUAL TREAD PNEUMATIC TIRES
Filed March 14, 1967  2 Sheets-Sheet 1

INVENTOR
WILLIAM BEZBATCHENKO JR.
BY
ATTORNEYS

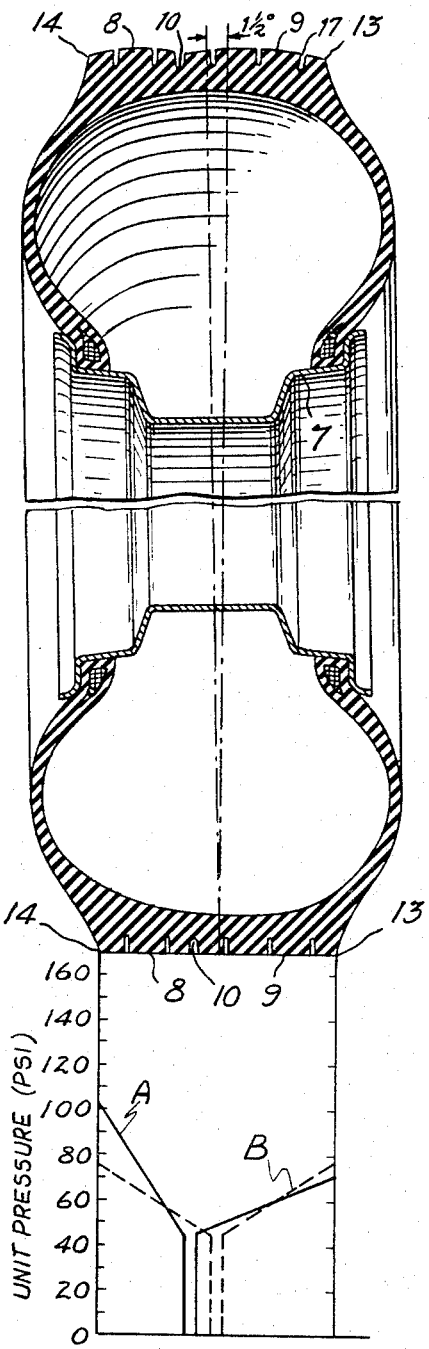
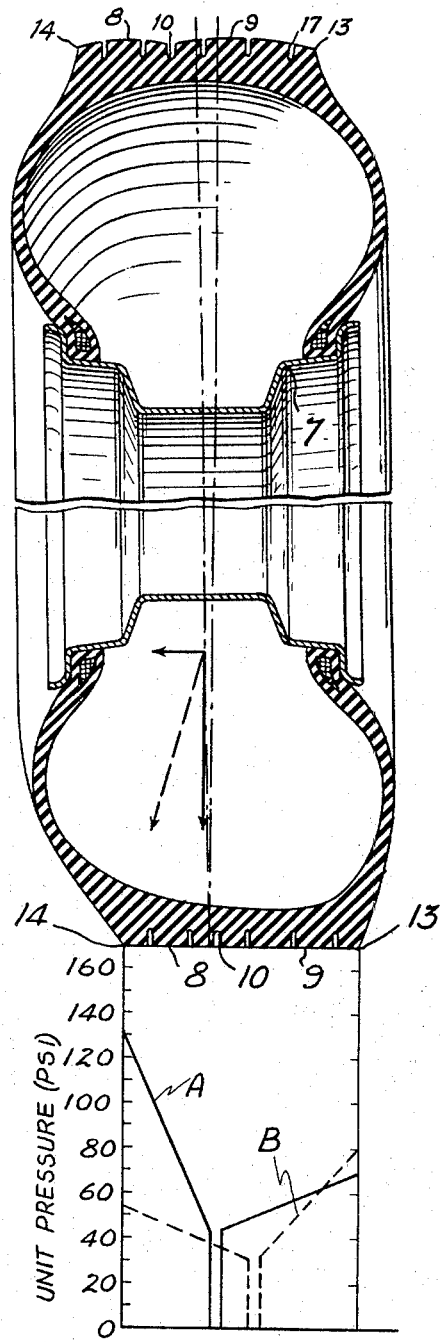

United States Patent Office 3,410,329
Patented Nov. 12, 1968

3,410,329
ASYMMETRICAL DUAL TREAD
PNEUMATIC TIRES
William Bezbatchenko, Jr., Cuyahoga Falls, Ohio, assignor to The General Tire & Rubber Company, a corporation of Ohio
Filed Mar. 14, 1967, Ser. No. 622,958
5 Claims. (Cl. 152—352)

ABSTRACT OF THE DISCLOSURE

A pneumatic tire is provided with two ground engaging tread bands of unequal width and having different radii of curvatures. The two tread diameters are equal, but the diameter of the narrow band shoulder is greater than that of the other shoulder. The tire exhibits very good turning stability when it is positioned so that the narrower band, representing between .30 and .45 of the total width of the tread, is located on the outside of the vehicle.

Background of the invention

Pneumatic tires are typically composed of a carcass, comprising one or more layers of rubberized fabric, a pair of beads adapted to hold the tire on the rim of a wheel, and a ground contacting portion commonly referred to as the tread. The tread is formulated from natural or synthetic rubber modified by the addition of oils, various fillers and reinforcing agents, processing aids and the like. A design is molded into the tread during curing of the tire and serves to improve the performance characteristics of the tire.

Until recently, the tread profile of most tires could be defined by a single radius of curvature from one shoulder to the other. A more recent development has been the dual tread pneumatic tire wherein a center groove divides the tread into two bands of equal width, each band having its own radius of transverse curvature with the two radii being of equal length.

It has been noted that these dual tread tires, as well as most other tires, undergo substantial lateral deflection when the vehicle is traveling around a curve. This is particularly noticeable in the outermost tires which exhibit a tendency to roll inwardly under the wheel rim. While this problem may be reduced by providing a flatter tread radius, this often results in an increase in heat buildup, thus reducing the effective lifetime of the tire. Tire squeal is also reduced when a relatively large tread radius is used. Reducing the tread radius reduces heat buildup, but this is offset by an increase in tire squeal and lateral instability while turning.

In conventional tires, the thickness of the shoulders of the tread relative to the central portion or crown is dependent upon the radius of transverse curvature which is not always constant from one side of the tread to the other. For the purpose of tread design, however, an equivalent radius may be calculated geometrically using the formula:

$$R = \frac{C^2}{8h} + \frac{h}{2}$$

In the above formula, R is the equivalent radius, C is the length of the transverse cord from one side of the tread surface to the other and h is the height from the shoulder of the tread to a transverse line tangent to the tread surface and parallel to the central axis of the tire. The trigonometric derivation of this formula will be obvious to those skilled in the art.

It will be apparent that a greater equivalent radius corresponds with a flatter tread and thicker shoulders. This construction gives better lateral stability but causes greater heat buildup in the tread and makes steering difficult when parking. A smaller equivalent radius, on the other hand, provides a cooler running tire and greater ease of steering while parking but poorer dynamic lateral stability.

On dual tread pneumatic tires, the equivalent radius may be computed using this same formula; however, it will be seen that the transverse tangent line from which the height, h, is measured will be tangent at two points—one on each tread band.

In operation, the tread of a tire is flattened by engagement with the road surface to provide a ground engaging area which, during straight line travel, bears a substantially uniform distribution of the wheel load.

When the vehicle travels around curves, a greater portion of the total load is borne by the tires on the outside of the turning radius due to the dynamic moments acting on the vehicle. A lateral thrust due to centrifugal force is also imposed on all ground engaging tires. This condition increases the tendency of the tire to side slip and to roll inwardly under the wheel rim during turns. Tires having treads formed according to the present invention have much less lateral deflection per unit load and provide for a more stable ride than those tires of conventional construction. The unique tread construction of the present invention provides these novel advantages primarily due to the proper location of the center of transverse curvature and proper selection of the radius of transverse curvature for each tread band. The relationship between these factors is of considerable importance in the invention as will be hereafter disclosed in detail.

It is among the objects of the present invention to provide a pneumatic tire having a tread which combines the advantages of a large radius and thinner tread and which also provides improved lateral stability when properly mounted on an automotive vehicle.

Another object of the present invention is to provide a pneumatic tire with a dual tread which divides the wheel load approximately equally between two tread bands of different widths and which has a greater diameter at the shoulder of the narrower tread band than at the other shoulder to afford better turning characteristics and improved lateral stability when the narrow tread band is mounted toward the outside of the vehicle wheel.

It is a further object of the present invention to provide a dual tread tire that affords greater safety in travel on curves at high speed.

Other objects, uses and advantages of this invention will become apparent from the following detailed description and accompanying drawings forming part of the specification in which:

FIGURE 3 is a transverse sectional view of an automobile wheel having mounted thereon a pneumatic tire having a dual tread embodying the present invention and showing the tire in its loaded condition with the unit pressure loading across the width of the tread indicated in the pressure chart included with the figure;

FIGURE 4 is a transverse sectional view of the automobile wheel of FIGURE 3, the tire being shown in its loaded condition with a side thrust caused by the movement of the vehicle around a curve, the unit pressure loading across the width of the tread being indicated in the pressure chart included with the figure.

Figure 1:
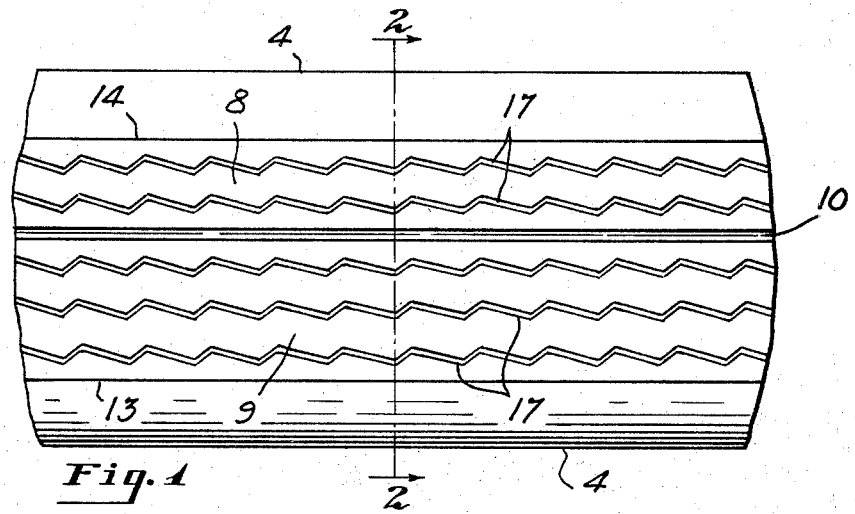
FIGURE 1 is a fragmentary top elevation of a pneumatic tire embodying the present invention having a dual tread with two tread bands of different transverse width and an off-center circumferential groove.

Referring more particularly to the drawings, there is shown a tubeless dual tread pneumatic tire embodying the present invention which comprises generally a carcass portion 1 made up of a plurality of plies of tire cord fabric, each of which consists of a layer of fabric 2 embedded in rubber, inextensible beads 3, sidewalls 4, an inner liner 5 adhered across the open interior surface of the tire from bead to bead, and a tread broadly indicated by the numeral 6. The tire is normally mounted on a vehicle wheel or rim 7 as shown in FIGURES 3 and 4.

The tread 6 comprises two ground engaging tread bands 8 and 9 of unequal width separated by a circumferential groove 10 which, as shown, is offset from the mid-circumferential plane of the tire so that the width of the narrower tread band 8 is from about .4 to .8 the width of the wider tread band 9. The tread is provided with a plurality of zigzag grooves 17 to improve the skid resistance of the tire.

Figure 2:
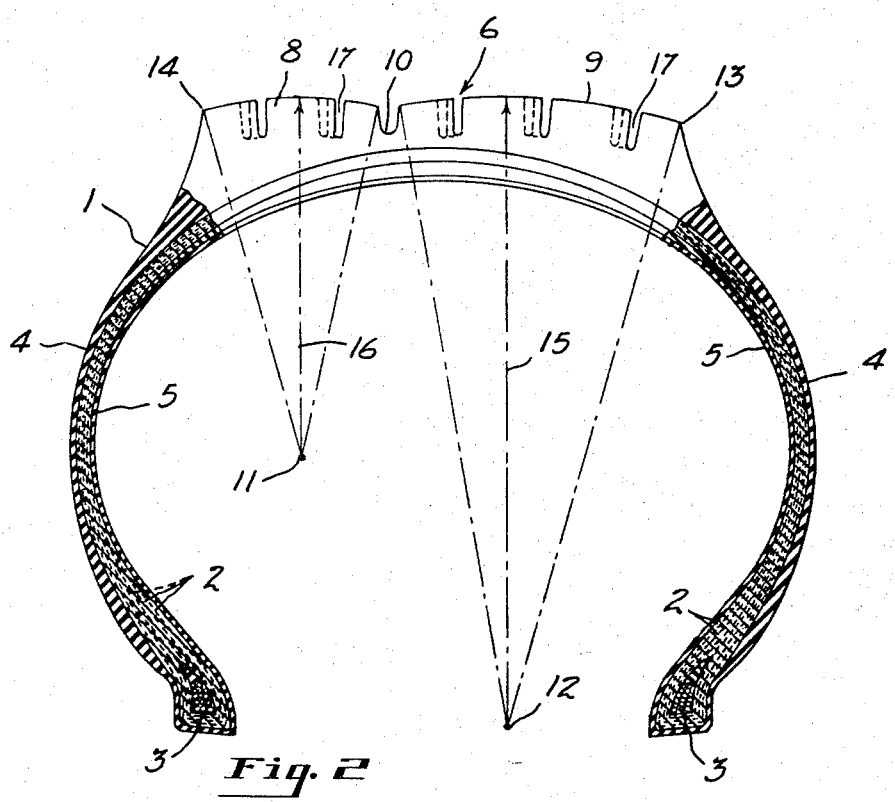
FIGURE 2 is a transverse sectional view taken substantially on the line 2—2 of FIGURE 1 with parts of the cross sectioning omitted for clarity and showing the tread contour schematically.

As shown in FIGURE 2, each tread band 8 and 9 has a transverse curvature, the curvature of the narrower band 8 being less than that of the wider band 9. The centers of transverse curvature 11 and 12 of the tread bands 8 and 9 are offset from the mid-circumferential plane of the tire; however, the wider tread band 9 has a center of transverse curvature 12 which is closer to the mid-circumferential plane than the center of transverse curvature 11 of the narower tread band 8 as shown in FIGURE 2. The location of the centers of curvature 11 and 12 is such that each tread band 8 and 9 will have the same maximum diameter even though the diameter of the tire at the shoulder 13 of the wider tread band 9 is smaller than that of the corresponding shoulder 14 of the narrower tread band 8. Normally, the radius of transverse curvature 15 of the wider tread band 9 is from about 1.5 to 2 times the radius of transverse curvature 16 of the narrower tread band 8. The width of the narrower tread band 8 should be from about .30 to .45 the total width of the tread.

When a tire having a tread embodying the present invention is mounted on the wheel of an automobile or other vehicle, the narrower tread band is placed on the outside of the vehicle wheel so that the outward shoulder of each mounted tire is thicker, or is of larger diameter, than its inward shoulder. Therefore, the unit pressures caused by the tires bearing against the road surface are higher on the outward shoulder of each tire than on the inward shoulder to provide better handling and control. A tire mounted on one of the front wheels of a vehicle will normally be slanted at a slight camber angle so that the concentration of pressure will be even higher on the narrower tread band.

FIGURES 3 and 4 show a pneumatic tire having a tread embodying the present invention mounted on a right front automobile wheel 7 having a 1½° camber, with the tire bearing a portion of the load of the vehicle. The tire of FIGURE 3 is in the normal loaded condition and the tire of FIGURE 4 is bearing an increased load caused when the vehicle travels around a curve. The distribution of unit pressures from one side of the tire to the other at points along a transverse line at the center of the ground engaging area of the tread is shown by the solid lines, A, on the pressure charts included with the figures. The dotted lines B represent the comparable pressure distribution for a dual radius tire of conventional construction.

The narrower tread band 8 bears a higher unit load than the wider tread band 9 and the points of greatest pressure are at the shoulders 13 and 14 of the tire. It will be noted, however, that in FIGURE 3 the area under line A for each tread band 8 and 9 is approximately the same since the greater width of the wider tread band 9 compensates for the higher unit pressures borne by the narrower tread band 8. Therefore, each tread band 8 and 9 bears an approximately equal share of the total load carried by the tire, under normal loading conditions; and accordingly, each tread band 8 and 9 is able to provide approximately the same amount of traction on normal pavement when the vehicle is in straight line travel. This applies to the conventional dual radius tire as well, as can be seen from the area subtended by dotted lines B in FIGURE 3.

FIGURE 4 and the accompanying pressure chart show the increase in pressure on the narrower outside tread band 8 due to the dynamic moments acting on the vehicle during a turn and the lateral load caused by centrifugal force. A vector diagram included in FIGURE 4 shows a typical distribution of forces acting on the tire during a turn. As indicated, a much greater portion of the wheel load is borne by the narrower tread band 8 and particularly by the outside shoulder 14 of this band. However, the wider inside tread band 9 bears a greater portion of the wheel load than the inside tread band of a conventional dual tread tire under similar conditions since it is relatively wider and extends across the mid-circumferential plane of the tire. Because of the thicker outside shoulder 14 of the tire, it has improved resistance to roll and greater lateral stability than tires heretofore known in the art, but at the same time provides balanced traction between the two tread bands 8 and 9 when the vehicle is in straight line travel.

A comparison between the dotted lines B of FIGURE 4 with those of FIGURE 3 reveals that, for a dual radius tire of conventional design where the two tread bands are of equal width and have the same curvature, the pressure, while turning, is redistributed to the inside of the tire, away from the outer rib. This factor contributes to the lateral instability of a tire of that construction and increases the tendency of the tire to roll under the wheel rim.

It is worth noting that the summation of the lateral forces developed between the tire and the contact surface at a high slip angle of about 8° away from the narrow tread are about 10% higher than those from a conventional dual tread tire. Thus, the road holding ability is correspondingly increased as well.

It should be noted that this invention is applicable to radial tires as well as bias ply tires. In a radial tire, the carcass is composed of one or more plies with the cords extending from bead to bead in a generally axial plane. One or more inextensible breaker strips serve to stabilize the tire. In bias ply tires, the cords of the carcass form an angle of about 35° with the mid-circumferential plane of the tire.

It should also be noted that the features of this invention can be combined with other unique construction features to further improve the handling qualities of the tire. For instance, the outer shoulder of the tire can be constructed as described and the inner shoulder can be rounded or stepped to make it easier for the tire to climb back on to the pavement after having left the highway.

What is claimed is:

1. In a pneumatic tire having a tread portion comprising a pair of road contacting tread bands of unequal width each having a convex transverse curvature and separated from one another by a circumferentially extending groove, the transverse radius of curvature of the wider tread band being greater than the corresponding radius of curvature of the narrower band, and the shoulder of the tire adjacent the narrower band normally having a greater diameter than the corresponding shoulder adjacent the wider band.

2. The pneumatic tire of claim 1 wherein the transverse width of the narrower tread band is between about .4 and about .8 of the transverse width of the wider tread.

3. The tire of claim 2 wherein the maximum diameters of the two tread bands are equal.

4. In combination, a pneumatic tire having inextensible beads, a carcass formed of superposed plies of reinforcing textile cords embedded in rubber, and a rubber tread consisting of a narrow tread band and a wide tread band and having a circumferential groove between said tread bands laterally spaced from the mid-circumferential plane of said tire and being of a depth to provide at its bottom a narrow flexible zone, the side edges of said tread bands forming said groove, said narrow tread band being from about .4 to about .8 the transverse width of said wide tread band, each of said bands having a ground engaging face in the form of a surface of revolution, each of said faces having substantially the same maximum diameter and having a convex transverse curvature, the shoulder of said narrow tread band having a larger diameter than the shoulder of said wide tread band and an automotive vehicle, said tire being mounted on a wheel of said vehicle with said narrow tread band to the outside thereof.

5. A pneumatic tire having inextensible beads, a carcass formed of superposed plies of reinforcing textile cords embedded in rubber, and a rubber tread having a circumferential groove laterally spaced from the mid-circumferential plane of said tire, and consisting of a narrow tread band and a wide tread band, said narrow tread band being from .4 to .8 the transverse width of said wide tread band, the side edges of said tread bands forming said groove, each of said bands having a ground engaging face in the form of a surface of revolution, each face having approximately the same maximum diameter and having a convex transverse curvature, the radius of transverse curvature of said narrow band being less than the radius of transverse curvature of said wide band, the transverse curvature of each of said tread bands having an approximate center of curvature that is offset from the mid-circumferential plane of said tire on the same side thereof as said tread band, the approximate center of curvature of said narrow tread band being offset more than the approximate center of curvature of said wide tread band, whereby the tread is flatter at the shoulder of said narrow tread band than at the shoulder of said wide band.

References Cited

FOREIGN PATENTS 1,475,630    2/1967    France.

DRAYTON E. HOFFMAN, *Primary Examiner.*

CHARLES B. LYON, *Assistant Examiner.*